(12) United States Patent
Tarloff et al.

(10) Patent No.: US 10,012,499 B2
(45) Date of Patent: Jul. 3, 2018

(54) WHEEL ALIGNMENT SYSTEMS AND METHODS

(71) Applicant: FARADAY & FUTURE INC., Gardena, CA (US)

(72) Inventors: Benjamin Charles Tarloff, Redondo, CA (US); Brian Andrew Homsangpradit, Long Beach, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 17 days.

(21) Appl. No.: 15/188,678

(22) Filed: Jun. 21, 2016

(65) Prior Publication Data

US 2017/0363419 A1 Dec. 21, 2017

(51) Int. Cl.
*G01B 11/275* (2006.01)
*B60G 7/00* (2006.01)

(52) U.S. Cl.
CPC ............ *G01B 11/275* (2013.01); *B60G 7/003* (2013.01); *B60G 2200/10* (2013.01); *B60G 2200/4622* (2013.01); *G01B 2210/10* (2013.01)

(58) Field of Classification Search
CPC ............ G01B 11/2509; G01B 11/2513; G01B 11/2545; G01B 11/2755; G01B 2210/146; G01B 2210/28; G01B 2210/286
See application file for complete search history.

(56) References Cited

U.S. PATENT DOCUMENTS

| 6,522,400 B1 * | 2/2003 | Horn ..................... G01B 11/275 356/138 |
| 7,428,781 B2 | 9/2008 | Wickhart |
| 2007/0124949 A1 * | 6/2007 | Burns, Jr. .......... G01B 11/2509 33/288 |

* cited by examiner

*Primary Examiner* — Luke D Ratcliffe
(74) *Attorney, Agent, or Firm* — Knobbe Martens Olson & Bear LLP (57) ABSTRACT

Systems, devices, and methods for analyzing the alignment of at least one wheel of a vehicle using a non-contact locating system. Systems can include a tie rod with a three-dimensional target that is used by a non-contact measuring instrument to determine the position of the target in three dimensional space. The target may be pyramidal in shape. The position of the target may be indicative of a desired wheel alignment.

17 Claims, 6 Drawing Sheets

WHEEL ALIGNMENT SYSTEMS AND METHODS

TECHNICAL FIELD

The present disclosure relates to vehicle wheel alignment systems. More specifically, disclosed herein are devices, systems, and methods for determining a vehicle wheel alignment without physically contacting the vehicle.

BACKGROUND

Proper alignment of the wheels of a vehicle is important for safe operation of the vehicle, proper steering control, and preventing excessive tire wear. The wheel alignment parameters that can be measured and adjusted when needed to achieve proper wheel alignment are camber angle, toe angle, and ride height. Alignment of the wheels can be measured and adjusted before final assembly of the vehicle. Alignment of the wheels can be measured and adjusted after final assembly and throughout the life of the vehicle.

Various systems have been designed to determine vehicle wheel alignment measurements, such as camber, toe, caster, and steering axis inclination (SAI). Generally, wheel alignment involves comparing initial readings to the specifications established by the vehicle's manufacturer, then applying appropriate adjustment techniques until the readings correspond to the recommended specifications.

SUMMARY

The devices, systems, and methods disclosed herein have several features, no single one of which is solely responsible for its desirable attributes. Without limiting the scope as expressed by the claims that follow, its more prominent features will now be discussed briefly. After considering this discussion, and particularly after reading the section entitled "Detailed Description" one will understand how the features of the system and methods provide several advantages over traditional systems and methods.

In some implementations, a method of aligning a vehicle having a steering knuckle that is coupled to at least one control arm and at least one tie rod may include one or more of the following. The method may include projecting a laser on a target positioned on a movable portion of the tie rod. The method may also include detecting at least a portion of the laser reflected from the target. The method may also include determining a position of the target at least based in part on the detected laser. The method may also include adjusting the position of the target until the target is in a position indicative of a desired alignment. The target may be configured to reflect the laser to a greater extent than the tie rod. The target may include a three dimensional protrusion extending from surrounding surfaces of the tie rod. In some aspects, adjusting the position of the target includes adjusting a length of the tie rod. In some aspects, adjusting the position of the target includes adjusting a ride height of the vehicle. In some aspects, the laser is projected up from a location positioned under or beneath the vehicle.

In some implementations, a method of verifying that a wheel of a vehicle is in a desired toe and camber position includes measuring a ride height of the vehicle. The method may also include retrieving a desired three dimensional position of a target disposed on a movable portion of the tie rod that is based at least in part on the measured ride height. The method may also include determining a position of the target disposed on the movable portion of the tie rod with a non-contact measuring system. The method may also include comparing the determined position with the retrieved position to determine if the knuckle is in the desired toe and camber positions. In some aspects, measuring the ride height of the vehicle includes projecting a laser on to a target positioned on an underside of the vehicle. In some aspects, retrieving a desired three dimensional position includes retrieving information from a memory circuitry. In some aspects, determining the position of the target disposed on the movable portion of the tie rod with a non-contact measuring system includes projecting a laser towards the target and detecting at least of portion of the laser reflected by the target.

In some implementations, an independent suspension and steering system may have a built-in target for a wheel alignment system. The suspension and steering system may include a knuckle couplable to a wheel. A control arm may be coupled to the knuckle and to a portion of a vehicle frame. The control arm may be movable about its connection to the frame. A tie rod may be coupled to the knuckle and to a portion of the steering system, the tie rod configured to have an adjustable length. A target may be disposed on the tie rod. The target may be configured to reflect electromagnetic waves to a greater extent than the tie rod. The target may be capable of use with a system for determining the position of the target in three dimensional space during a wheel alignment.

BRIEF DESCRIPTION OF THE DRAWINGS

The disclosed aspects will hereinafter be described in conjunction with the appended drawings, provided to illustrate and not to limit the disclosed aspects, wherein like designations denote like elements. The drawings disclose illustrative embodiments and particularly illustrative implementations in the context of separating the components of whole blood. They do not set forth all embodiments. Other embodiments may be used in addition to or instead. Conversely, some embodiments may be practiced without all of the details that are disclosed. It is to be noted that the figures provided herein are not drawn to any particular proportion or scale, and that many variations can be made to the illustrated embodiments.

FIGS. 2A and 2B are simplified rear views of an embodiment of a system for determining alignment of a left wheel. FIG. 2A illustrates a wheel with zero camber. FIG. 2B illustrates a wheel with negative camber.

FIGS. 3A and 3B are simplified underside views of an embodiment of a system for determining alignment of a left wheel. FIG. 3A illustrates a wheel with zero toe. FIG. 3B illustrates a wheel with toe in.

FIGS. 4-5 are plan views of embodiments of tie rods with protruding targets. FIG. 4 illustrates a pyramidal shaped target with the apex of the pyramid off-center. FIG. 5 illustrates a pyramidal shaped target with the apex of the pyramid in the center of the base.

DETAILED DESCRIPTION

Motor vehicles can have an independent suspension that allows each wheel to move vertically independent of each other. In other types of suspensions, the wheels are linked and movement on one side can affect the wheel on the other side. One with ordinary skill will realize that the invention can be adjusted to work with different suspension types and designs. In some aspects, the vehicle may include an air suspension system. The air suspension may be able to adjust the ride height of the vehicle.

Toe is the angle of the wheel with respect to the vehicle created by pointing the tires inward or outward when viewed from a top-down view. The toe angle of a wheel is generally the angle between a longitudinal axis of the vehicle (running from the rear to the front of the vehicle) and the line of intersection of the wheel plane and the road surface. Toe angle can also be measured as the angle a wheel makes with the longitudinal axis of the vehicle. Toe out, or negative toe, is the front of the wheel pointing away from a central longitudinal axis of the vehicle. Toe in, or positive toe, is the front of the wheel pointing towards a central longitudinal axis of the vehicle. Toe can be measured as an angle or in inches or millimeters. Toe can affect areas of performance, such as tire wear, straight line stability, corner entry handling characteristics, and others.

The toe angle can be adjusted by adjusting the tie rod, a linkage between the wheel and the steering system of the vehicle. The tie rod may have an adjustable length, such that it can be shortened or lengthened. The end of the tie rod that connects to the wheel may be a ball joint. The ball joint may connect to a knuckle. The tie rod may be threaded such that a turn of the tie rod corresponds to a change in length of the tie rod. The tie rod may have an adjustment sleeve, such that the length of the tie rod is adjustable. The tie rod may connect to a steering system. The tie rod may have a three-dimensional feature, or target, to help determine the position and length of the tie rod.

Camber angle is the measure in degrees the difference between a wheel's alignment and a vertical axis perpendicular to the ground surface. When a wheel is perfectly perpendicular to the surface, its camber would be zero degrees. The camber angle of a wheel can be measured as the inclination of the wheel plane with respect to vertical. Camber angle can also be measured as the angle made by the wheel of the vehicle and a vertical axis when viewed from the front or rear of the vehicle. If the bottom of the wheel is farther out than the top, it is called negative camber. If the top of the wheel is farther out than the bottom, it is called positive camber. Camber angles alter the handling qualities of a particular suspension design. For straight-line acceleration, a camber angle of zero allows the tire to be flat on the road. When taking a turn, the tire tilts. The control arm adjusts for this natural tilt to maximize the contact area of the tire. The contact area of the tire is the amount of tire that is in contact with the ground. To correct for the tilting, the wheel needs to be properly aligned, such that the actual alignment is similar or substantially similar to a desired alignment. An improper camber angle can lead to increased tire wear and impaired handling.

The camber angle can be adjusted by adjusting the lower control arm, a linkage between the wheel and the frame or subframe of the vehicle. The lower control arm may connect to a knuckle. The lower control arm may have a fixed length.

Camber angle and toe angle are dependent on the ride height of the vehicle. Front and rear camber and front and rear toe can vary based on the ride height of the vehicle. Ride height can be measured as the distance between various points on the vehicle chassis and a plane which supports the wheels of the vehicle. Ride height can also be measured between two points on the vehicle. The ride height measurement may depend on the desired accuracy level of the wheel alignment.

Ride height can be determined based on the height of the lower control arm with respect to a plane which supports the wheels of the vehicle. The height of the lower control arm can be measured at any point along the body of the lower control arm. In some instances, the height can be measured at a point on the lower control arm that is adjacent to the frame or subframe.

Ride height can be determined based on the height of the frame or subframe with respect to a plane which supports the wheels of the vehicle. The height of the frame or subframe can be measured at any point along the body of the frame or subframe. In some instances, the height can be measured at a point on the frame or subframe that is adjacent to the lower control arm. In some instances, the height can be measured at a point on the frame or subframe that is at about the midpoint of the vehicle's lateral axis (side-to-side direction).

An adjustment to ride height can change the toe angle of a wheel. An adjustment to the ride height can change the camber angle of a wheel. The ride height can be measured for at least one wheel. The ride height can be measured for each axle. The ride height can be measured for each side of the vehicle. Ideally, the ride height is the same for all wheels for better styling and ride comfort.

The present alignment system can determine vehicle wheel alignment and provide easy and accurate measurements for camber and toe. The ability to measure accurately the alignment of the four wheels of the vehicle allows the source of a misalignment to be determined. This determination of a source of a misalignment is helpful when working with and analyzing prototypes. A misalignment may be due to various components of the vehicle, such as the suspension system or chassis.

Traditional wheel alignment often involves a plurality of camera units that are clamped onto the wheel, thus requiring contact with the wheel. Other systems that do not require physical contact with the vehicle may utilize one or more side facing cameras and one or more laser beams that are projected onto the outwardly facing sides of the vehicle's wheels and/or tires.

In the present alignment system, the position(s) of the lower control arm, tie rod, and or frame/subframe (e.g. ride height) may be determined by non-contact measurement systems. Such systems may include a combination of an electronic transmitting ("ET") device and an electronic measuring ("EM") device (also referred to as a "ET/EM device" or "ET/EDM device." The ET/EM device may comprise at least one laser emitter and at least one laser detector. However, any device or combinations of devices that can emit and detect electromagnetic signals may be utilized.

There may be at least one ET/EM device to determine the position(s) of one or more targets on the vehicle's suspension/alignment systems. For example, a target may be located on one or more of the tie rod, the lower control arm, and the frame/subframe. In some embodiments, there may be two ET/EM devices, one to determine the position of a target on the tie rod and one to determine the position of a target on the lower control arm or frame/subframe. In some embodiments, there may be three ET/EM devices, one to determine the position of the tie rod, one to determine the position of the lower control arm, and one to determine the position if the frame/subframe with respect to the ground (e.g. a target used to determine the ride height of the vehicle). Other combinations are also contemplated.

In some embodiments, to determine the alignment of four wheels there may be at least one ET/EM devices to detect at least one target that is associated with each wheel. Such a system may be preferable when there are four wheels that each have an independent suspension system. The non-contact measuring instrument may use light, laser light, UV light, infrared light, sound, radio, or other electromagnetic frequency signals and/or means of determining a location of a target without contacting the vehicle. The non-contact measuring instrument may be a laser scanning device, electronic distance measurer, or the like, that measures the distance from the instrument to the three dimensional feature. The instrument may send out an infrared beam which is reflected back to the unit, and the unit may use timing measurements to calculate the distance traveled by the beam. In some aspects, the target is temporarily placed on the vehicle. Thus, the target may be removable. In other aspects, the target is permanently installed on the vehicle.

The ET/EM device may also have a keypad and/or a display. The ET/EM device may have or be in communication with a calculator, computer, circuitry, and the like, which may perform the trigonometric functions needed to calculate the location of any point sensed based on the angle and distance information recorded for the sensed point. The ET/EM device may be able to determine the slope of the surface that the instrument is scanning. The ET/EM device may use a Euclidean coordinate system with coordinates x, y, and z corresponding to the lateral, longitudinal, and vertical directions, respectively, of a vehicle to be aligned. Absolute distances along the various axes may be arbitrary and calculations may be based on relative distances.

In some aspects, the alignment can be determined at least in part by determining the position of a movable target that is positioned on the vehicle's tie rod without physically clamping any temporary device to the vehicle. The target may comprise a reflective surface. Thus, the target may be configured to reflect light to a greater extent than other portions of the underside of the vehicle (e.g. other portions of the tie rod). The target may be permanently installed in the vehicle. That is to say, the target may be a factory installed component of the vehicle. For example, the target may be formed on at least a portion of the tie rod or formed on at least a portion of the control arm or formed on at least a portion of the frame/subframe.

The target may be positioned on the underside of a tie rod. Thus, the position of the target may be determined by positioning one or more laser light sources and one or more laser light detectors underneath the vehicle. The one or more laser light sources may project one or more laser beams up from underneath the vehicle. The laser light source may comprise a scanning laser. By sensing the light reflected by the target, using one or more light detectors, the position of the target may be determined. The desired position of the target will depend on the desired alignment. In some aspects, the target may be moved until it is in the desired position that is indicative of the desired wheel alignment. In some aspects, the target may be moved by adjusting the length of the tie rod. Due to the interplay and the attachment of the various components, in some implementations, the desired wheel alignment may be determined entirely by determining the position of a single target placed on the tie rod. In other aspects, the desired wheel alignment may be determined by determining the position of a target placed on the tie rod and by determining the ride height of the vehicle.

The ride height of the vehicle may be determined at least in part by determining the position of a target that is positioned on the underside of the vehicle. As such, a target may be positioned on the underside of the frame and/or subframe. The target may be a reflector. The target may be permanently installed on the vehicle. In some aspects, the target is disposed on an underside of the frame and/or subframe that is directly adjacent to an attachment point of the control arm. In some aspects, the target is disposed on an underside of the frame and/or subframe that is at about the midpoint of the lateral axis of the vehicle. By sensing the light reflected by the target, using one or more light detectors, the ride height of the particular wheel/suspension system may be determined. In some aspects, the ride height may be changed by adjusting the suspension. For example, an air suspension for each wheel may be used to raise and/or lower the ride height of the vehicle. The ride height of the vehicle can describe the ride height of the particular wheel/suspension system. The ride height of the vehicle can describe the ride height of a particular axle. The ride height of the vehicle can describe the ride height of a particular side of the vehicle.

In some aspects, the alignment can be determined at least in part by determining the position of a target that is placed on the lower control arm. The position of a target that is placed on the lower control arm may be determined at least in part by determining the position of a target that is positioned on the underside of the lower control arm. The target may be a reflector. The target may be permanently installed on the vehicle. By sensing the light reflected by the target, using one or more light detectors, the position of the target on the control arm may be determined. In some aspects, the position of the target on the lower control arm may be changed by adjusting the suspension. For example, an air suspension for each wheel may be used to move the lower control arm with respect to the vehicle. As one would appreciate, a similar implementation may include a target located on an upper control arm.

In some implementations, the determination of the position of the target on the tie rod may be aided by the use of a three-dimensional target. The position of such a target may be determined by a non-contact measuring instrument. The target may be a three dimensional pyramid shape. The target may be reflective. The center point of the pyramid can be off-center so that the surface of each side of the target has a different slope, for example, an oblique pyramid. The pyramid may be a three sided or four sided pyramid. The center point of the pyramid may be in the center. The target may be partially spherical or cylindrical in shape. The target may have a shape such that a change in the position of the target corresponds to a change in position along the body of the tie rod in the lengthwise direction. The slope or slopes of the surfaces of the target are different from the slope or slopes of the adjacent surface or surfaces of the body of the tie rod, which aids in the determination of the position of the target. The adjacent surface of the body may be flat.

A sweeping laser can scan a path that goes across the underside of the vehicle, the position of the target may be determined based on laser light that is reflected by the target. The laser can be used to determine the slope of the surface that it reflected off of by sensing the reflected light with one or more detectors and/or by determining the time it took the laser to travel. The length of the tie rod and/or the position of the wheel in three dimensional space can be determined based on the determined position of the target.

The camber angle can be calculated from at least the determined height of the lower control arm, trigonometry, and known geometric relationships between the lower control arm and the wheel. The toe angle can be calculated from at least the determined position of the tie rod, trigonometry, known distance between the lower control arm and the tie rod, and known geometric relationships between the tie rod and the wheel. With the present alignment system, a single wheel of a vehicle can be aligned. With the present alignment system, four wheels of a vehicle can be aligned and the alignment parameters for at least two wheels can be monitored simultaneously. Adjustments made to one wheel may affect the alignment of another wheel. The alignment system can monitor all wheels of the vehicle so that such a change in alignment can be noticed by the user in a timely manner.

The present alignment system can be incorporated as part of an assembly line. The alignment of the wheel can be done before the tires are installed on the vehicle so the chassis can be pre-aligned before being attached to the vehicle. The alignment of the vehicle can be done after the tires are installed on the vehicle. The present alignment system can be incorporated into a service shop or the like and done after the vehicle has left the factory. With the present alignment system, the alignment can be done in less time than traditional methods.

In some aspects, the alignment system determines the position of a target located on the tie rod. The position may be a position in three-dimensional space. The wheel alignment may be determined by using the position of the target. In some aspects, the ride height of the vehicle is also measured. The wheel alignment may be determined by using the position of the target and the ride height of the vehicle. In this way, the alignment may be confirmed and/or adjusted as desired.

Figure 1:
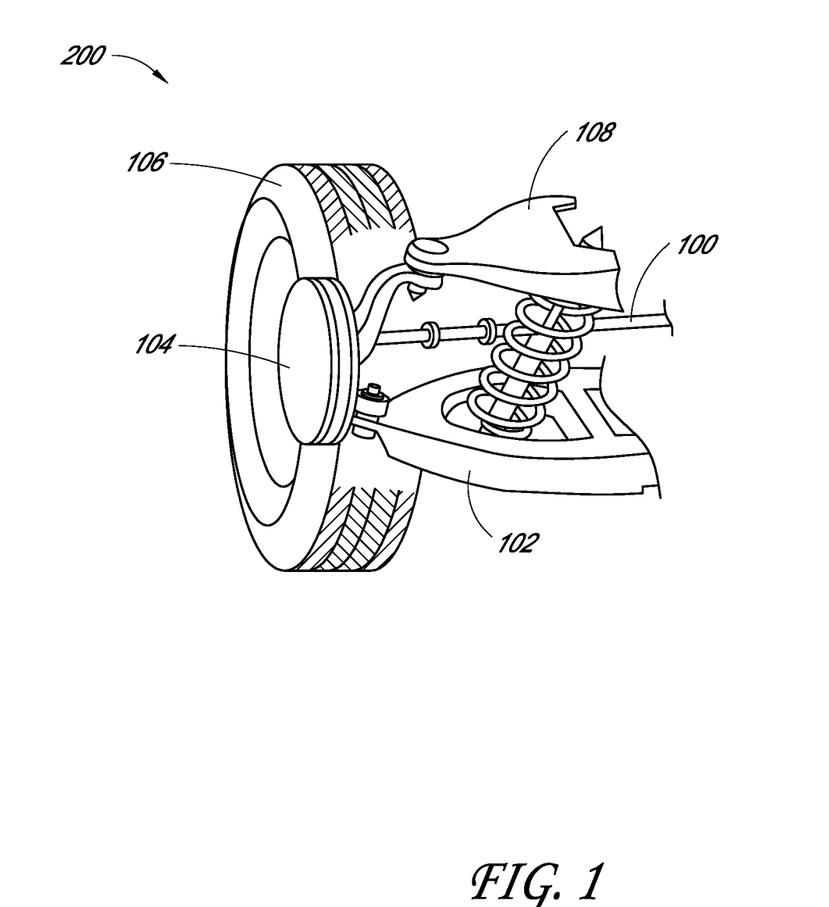
FIG. 1 is a perspective view of an example suspension of a vehicle's left wheel.

FIG. 1 illustrates a simplified independent suspension system 200. The suspension system 200 includes a wheel 106 coupled to a knuckle 104. During an alignment procedure, the wheel 106 may or may not be attached to the vehicle. The knuckle 104 can be coupled to a lower control arm 102 which can be coupled to a frame/subframe of the vehicle (not shown). The lower control arm 102 is generally configured such that it can rotate with respect to the frame/subframe in a hinge-like manner about the connection point of the lower control arm 102 to the frame/subframe. The lower control arm 102 may have a fixed length. The knuckle 104 can be coupled to an upper control arm 108.

A tie rod 100 may also be coupled to the knuckle 104 with, for example, a ball joint. The tie rod 100 may also be coupled to a steering system (not shown). The length of the tie rod 100 may be adjustable. Adjusting the length of the tie rod 100 may adjust the toe angle as further described below. Movement of the tie rod 100 may cause the knuckle to rotate, thus turning the wheel 106 with respect to the vehicle.

Figure 2A:
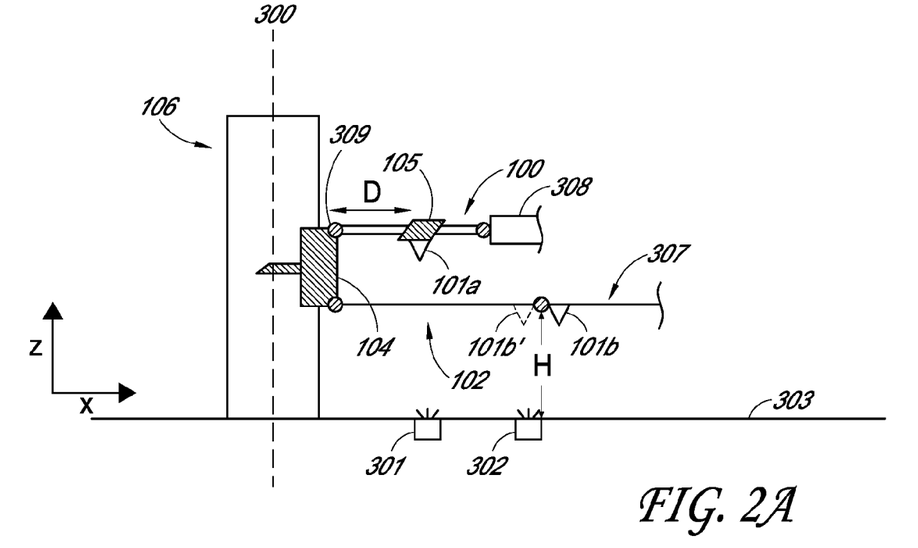

FIG. 2A is a rear view of the simplified suspension system 200 shown in FIG. 1. The wheel 106 is shown as aligned with the vertical (or "z") axis 300. Thus, as shown, the wheel 106 is in a zero camber position. FIG. 2A further illustrates that the lower control arm 102 is positioned parallel and in-line with the subframe 307. In some aspects, the desired camber angle 305 may be achieved when the lower control arm 102 is in this illustrated position. However, in other implementations, the desired camber angle 305 may be achieved when the control arm 102 is at an angle with respect to the subframe 307. Similarly, in some aspects, the suspension system 200 may be configured such that the wheel 106 is in a positive or negative camber position 305 when the lower control arm 102 is positioned parallel and in-line with the subframe 307.

As will be appreciated by those of skill in the art, the ride height "H" may affect the camber and the toe. As shown in FIG. 2A, the ride height H may be measured as the distance of the ground 303 to the underside of the subframe 307. In some aspects, a target 101*b* is positioned on the underside of the subframe 307 adjacent to the attachment point of the lower control arm 102 to the subframe 307. In some aspects, a target 101*b*' is positioned on the underside of the lower control arm adjacent to the attachment point of the lower control arm 102 to the subframe 307.

The ride height H may be determined by a non-contact measurement. For example, the target 101*b* may comprise a reflector. The reflector may be a light reflector. A light, for example, a laser light, may be directed at the target from below the vehicle. One or more sensors may also be positioned below the vehicle. The one or more sensors may be laser light detectors. The ride height may thus be determined by travel time of the light from the light source to the reflector and to the detector and the known positions of the light source and the one or more detectors.

Continuing with FIG. 2A, one end of the tie rod 100 is connected to the knuckle 104 by, for example, a ball joint 309. The other end of the tie rod 100 can be connected to a steering system 308. The tie rod 100 may include a receiving portion 105 (discussed below) and a target 101*a*. The target 101*a* may comprise a reflective surface. In some aspects, the target 101*a* is a 3-dimenstional reflective object. In some aspects the 3-dimensional reflective object is pyramidal or triangular in shape.

The lower control arm 102 may have a point, for example, a reflective surface or other indicator, which aids in determining the height of the lower control arm 102. The distance between the lower control arm 102 and the tie rod 100 in the z direction may be known.

Figure 2B:
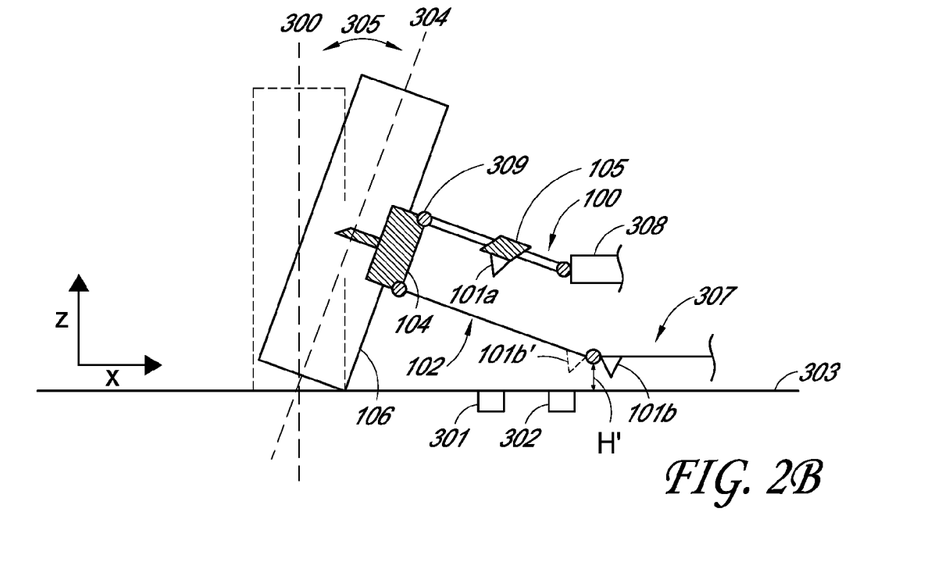

As discussed above, lowering the ride height from H to H' may affect the camber and/or toe. As shown in FIG. 2B, lowing the ride height to H' produces a negative camber angle 305. As such, the ride height measurement may be used, at least in part, to determine and/or adjust the wheel alignment. As also shown in FIG. 2B, ride height H also affects the position of the target 101*a* on the tie ride 100. Thus, changes in the ride height H change the position of the target 101*a* on the tie rod 100 at least in the x-z plane. As such, due to known geometric relationships, the position of the target 101*a* on the tie ride 100 in the x-z plane may be inferred and/or calculated by the measured ride height H. The ride height may be adjusted using known techniques. In some aspects, the ride height H is changed by adjusting the air suspension.

Figure 3A:
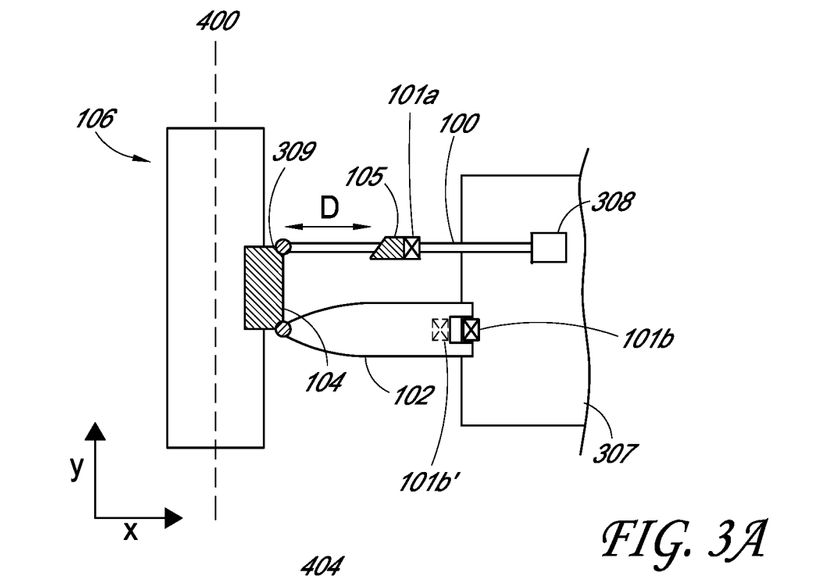

FIG. 3A is an underside view of a simplified suspension system of the wheel shown in FIGS. 2A-2B. The wheel 106 is shown aligned with the longitudinal (or "y") axis 400. Thus, as shown, the wheel 106 is in a zero toe position. The y-axis 400 can be parallel to the longitudinal axis of the vehicle to be aligned. As will be discussed below, the toe angle of wheel 106 may be changed by adjusting the length of the tie rod 100.

The length of the tie rod 100 may be adjustable. For example, the tie rod 100 may include a receiving portion 105 that is configured to receive a portion of the length of the tie rod 100. In some aspects, the receiving portion 105 includes a female threaded section configured to receive a male threaded section. Thus, the total length of the tie rod 100 may be shortened in length by screwing the male threaded section into the female threaded section of the receiving portion 105 and increased in length by unscrewing the male threaded section from the female threaded section of the receiving portion 105. Other methods and devices for changing the length of the tie rod 100 may also be implemented.

FIG. 3A further illustrates that the target 101a is a distance "D" from the knuckle 104. In some aspects, the target 101a is moveable relative to the knuckle 104, such that the distance D from the knuckle to the target changes as the length of the tie rod 100 is adjusted.

Figure 3B:
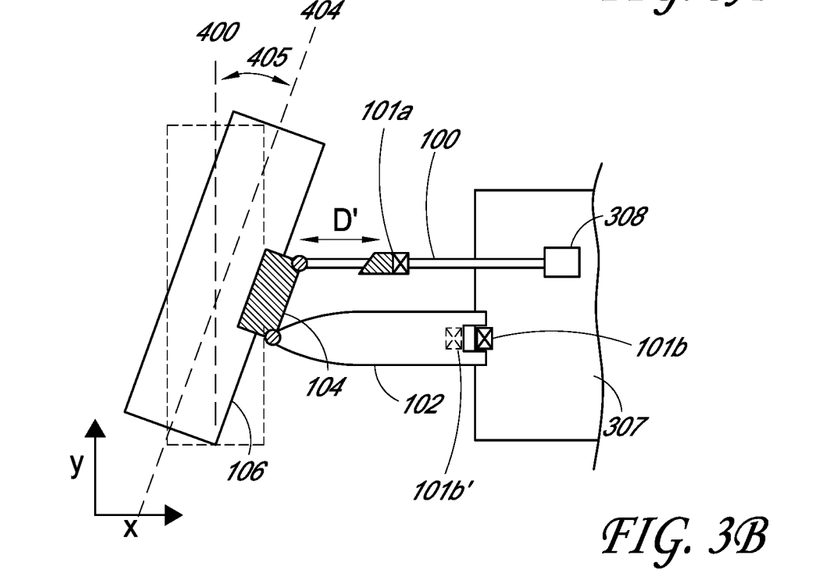

FIG. 3B illustrates that the tie rod 100 has been shortened such that target 101a is now a distance, D' from the knuckle 104. In some aspects, when the length of the tie rod 100 is adjusted, the position of the target 101a along the x-axis is changed and the toe angle of the wheel is adjusted. The wheel 106, shown aligned with the axis 404, which is at an angle 405 from the y-axis 400. Thus, as shown, the wheel 106 is in a toe-in position. The toe position can be determined as the angle 405 between the axis 404 and the y-axis 400. Toe can be measured in linear units or as an angular deflection. In some aspects, the toe can be determined as a measurement in inches or millimeters.

The target 101a may be positioned on the tie rod 100 such that the position of the target moves as the length of the tie rod 100 changes. As shown in FIGS. 3A-3B, the position of the target 101a may move a least along the lateral (or "x") axis, which extends in the side-to-side direction of the vehicle. The position of the target 101a thus changes as the length of the tie rod 100 changes. Accordingly, the target 101a may be located on the moveable part of the tie rod 100, such that when the length of the tie rod 100 is adjusted, the position of the target 101a changes at least in the x-y plane.

While shown as positioned parallel with the x-axis in FIGS. 3A-3B, the suspension system may be configured such that the tie rod 100 is positioned at an angle with respect to the x axis. Thus, changes in the length of the tie rod may change the position of the target in the x-y plane. Similarly, the suspension system may be configured such that the tie rod 100 is positioned at an angle with respect to the z axis. Thus, changes in the length of the tie rod may change the position of the target in the x, y, and z directions.

The target 101a may be on the bottom surface of the tie rod 100. In this position, the target 101a is visible to a non-contacting measuring instrument 301 that is below the tie rod 100. In some embodiments, the target 101a may be on another side of the tie rod, for example, the rear or top, and would be visible to a non-contacting measuring instrument in a different position. The placement of the target 101a on the bottom surface of the tie rod 100 may reduce the likelihood that other components of the vehicle obstruct the view of the measuring instrument 301 and may provide a more accurate determination of position.

Figure 4:
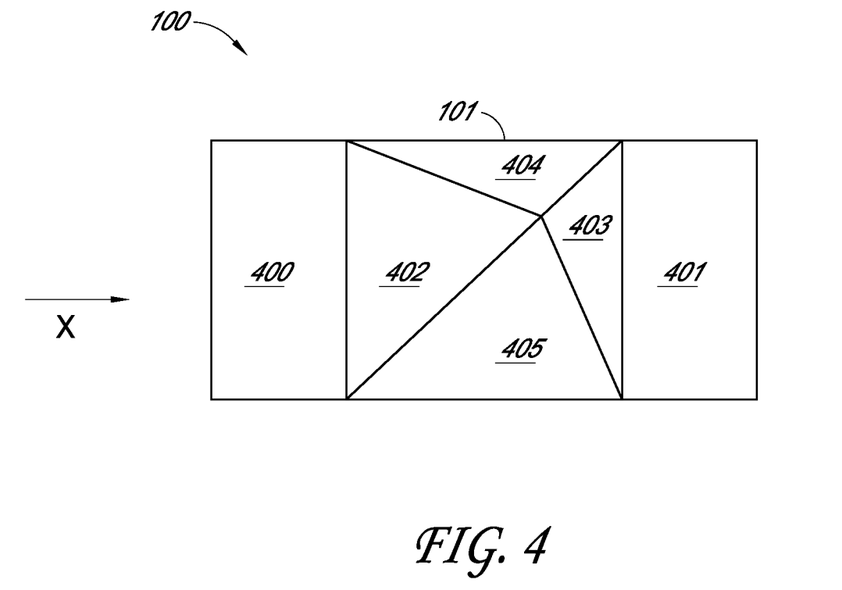
Figure 5:
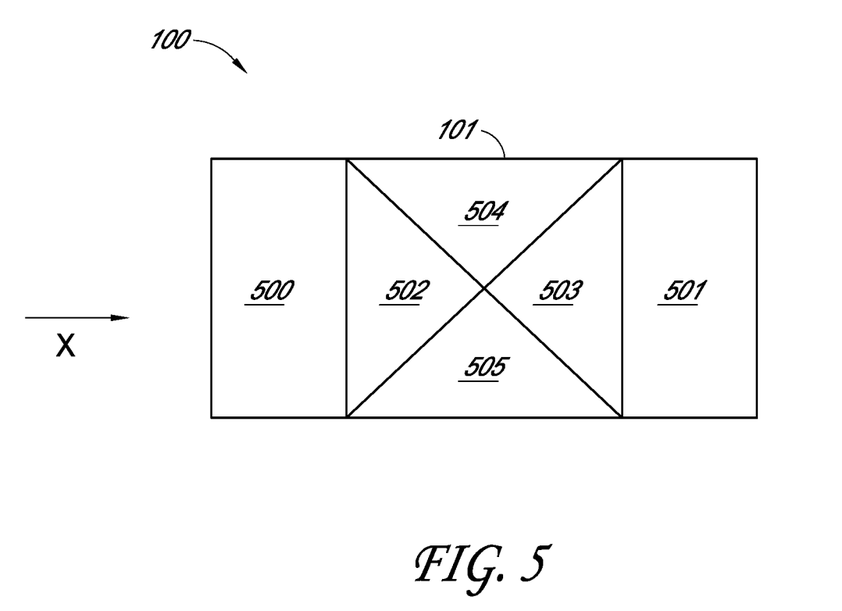

FIGS. 4-5 illustrate plan views of targets and the adjacent surfaces on embodiments where the targets are positioned on tie rods. FIG. 4 illustrates a target with an off-center pyramidal shape. FIG. 5 illustrates a target with a pyramidal shape, where the apex of the pyramid is centered at about the center of the pyramid base. Surfaces 400, 401, 500, and 501 are surfaces on the tie rod 100 that are adjacent to the target 101. Surfaces 400, 401, 500, and 501 may be flat, or rounded, or less reflective than the target 101. In some aspects, surfaces 400, 401, 500, and 501 are substantially non-reflective. The target 101 may be made from a reflective material. The target may be made from the same or substantially similar material as the tie rod. The target 101 may be a three-dimensional feature, for example, a pyramid, triangle, or a type of prism.

The target 101 may have inclined surfaces 402, 403, 404, and 405. The surfaces 402-405 may or may not be reflective. Each surface 402-405 can have a different slope. Surface 503 can have a steeper slope than surfaces 502, 504, and 505. In this way, a small amount of controlled movement at the non-contacting measuring instrument's source or at the target 101 will generate a change in the z measurement determined by the non-contacting measuring instrument. A plurality of non-contacting measuring instruments can be used. Depending on the measurement that is made by the non-contacting measuring instrument, the position of the target 101 can be determined relative to the known location of a fixed measurement point 101b. In this way, the direction that the target 100 should be moved in to achieve the desired position of the target in three-dimensional space may be determined. The sensing, determining, and moving of the target may be performed quickly by one or more automated systems until the desired position of the target may be reached. The desired position of the target may be indicative of a desired wheel alignment.

In some aspects, the position of the target 101 is determined by directing a laser at the target 101 from underneath the vehicle. The laser may be a scanning laser than sweeps along the underside of the vehicle along the x-direction. When the laser hits surface 402-405, some light is reflected back down and at an angle away from the laser source. In some aspects, there may be sensors around the laser positioned to sense the reflected light and determine which surface 402-405 the laser is being reflected off of. The non-contacting measuring instrument may also measure the linear distance to surfaces 402-405 by the portion of light that returns directly to the source and knowing the angle of the outputs at 301 or 302 determine the components of change from one measurement to the next in the z and x directions. The position of the target 101 may be moved by adjusting, for example, the ride height and/or the length of the tie rod until the desired position of the target 100 is detected.

Figure 6:
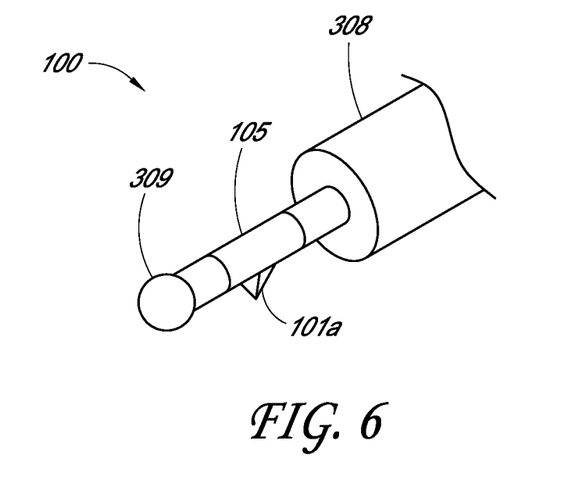
FIG. 6 is a perspective view of an embodiment of a tie rod with a protruding feature.
Figure 7:
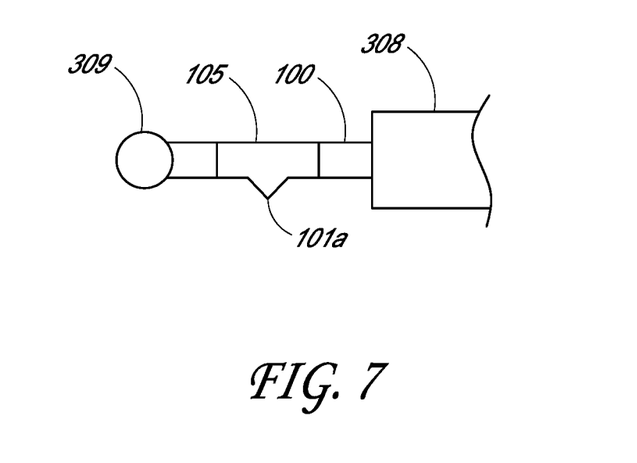
FIG. 7 is a side view of an embodiment of a tie rod with a protruding target.

FIGS. 6-7 illustrate an embodiment of a tie rod 100 with a protruding three dimensional target 101. The target 101 may extend outwards from the body of the tie rod 100. The target 101 may be on the underside of the tie rod 100, as shown in FIG. 7. The underside of the tie rod 100 may be machined flat. The underside of the tie rod 100 may be rounded. The tie rod 100 may have a ball joint 309 at one end, which attaches to a knuckle 104. The other end of the tie rod 100 may connect to a steering system 308. The target 101 can be located on the underside for visibility and less interference by other components of the vehicle. The target 101 may be a pyramid. The apex of the pyramid may be off-center, such that the pyramid is oblique. The apex of the pyramid may be in about the center of the base of the pyramid. The target 101 may be another shape, for example, spherical, cylindrical, or triangular. The shape of the target 101 may be configured such that a change in height of the feature, in the vertical (or "z") direction, corresponds to a change in position of the feature along the body of the tie rod 100 or x direction. The target 101 can be machined as integral to the body of the tie rod 100 or may be attached to the body of the tie rod 100. The control arm may have a similar three dimensional feature. A portion of the tie rod 100 may be threaded and connect to an adjusting sleeve, which adjusts the length of the tie rod. In some embodiments, a turn of the tie rod 100 corresponds to a known change in length of the tie rod 100.

Figure 8:
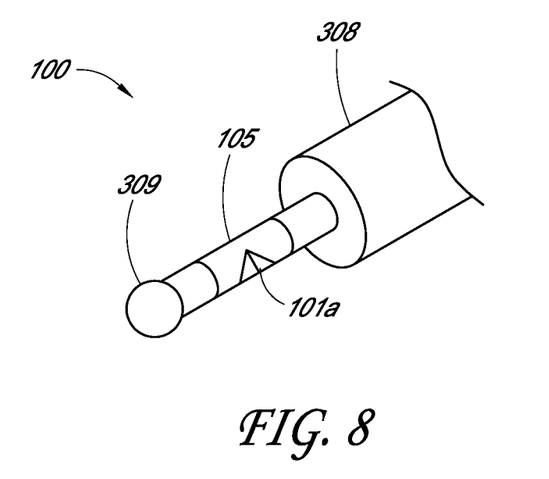
FIG. 8 is a perspective view of an embodiment of a tie rod with a recessed target.
Figure 9:
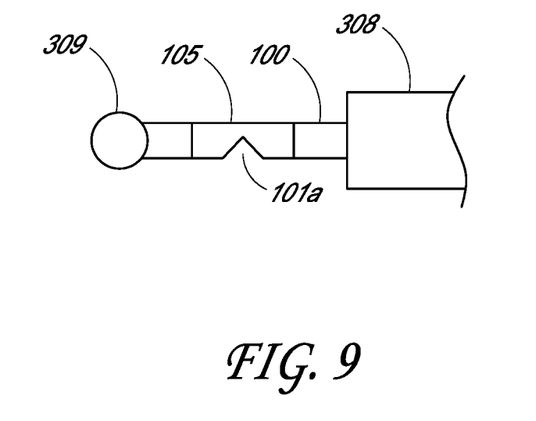
FIG. 9 is a side view of an embodiment of a tie rod with a recessed target.

FIGS. 8-9 illustrate an embodiment of a tie rod with a recessed three dimensional target 101. The recessed target

101 may extend internally into the body of the tie rod 100. The target 101 can be located on the underside for visibility and less interference by other components of the vehicle. The target 101 may be a pyramid that extends into the body of the tie rod 100. The underside of the tie rod 100 can be rounded. The underside of the tie rod 100 can be machined flat. The control arm may have a similar three dimensional feature. The three dimensional feature may be pyramidal, spherical, cylindrical, or another shape that allows the position to be determined by a non-contact measuring instrument.

A method for aligning a wheel of a vehicle may proceed as described below. The vehicle may include a wheel that is couplable to a knuckle. The knuckle may be coupled to at least a lower control arm and a tie rod. The lower control arm may also be coupled to the frame of the vehicle. The method may include determining the ride height of the vehicle. Based on the ride height, the desired position of a target positioned on the tie rod (indicative of the desired wheel alignment) may be determined. The position of the target on the tie rod may then be determined. The actual location of the target on the tie rod may be compared to the desired location of the target on the tie rod. If the desired position and the actual position substantially correspond, then the desired alignment is confirmed. However, if the desired position and the actual position do not substantially correspond, then the position of the target on the tie rod may be changed. The position of the target on the tie rod may be changed by, for example, adjusting the length of the tie rod. The position of the tie rod may again be determined and compared to the desired position and the process repeated until the target is placed in the desired position that is indicative of the desired wheel alignment at the determined ride height. In some aspects, the ride height that is determined may be compared to a desired ride height and the ride height may be adjusted until the desired ride height is achieved.

One or more non-contact measuring instruments may be utilized according to the present disclosure. The non-contact measuring instruments may be ET/EM devices. The ET/EM device may be positioned such that it is at least partially within the line of sight of the one or more targets 101 on vehicle suspension system. As discussed above, targets 101 may be positioned on the tie rod, control arm, subframe, and the like in order to determine the position of points on the suspension system in three dimensional space.

An ET/EM device may be configured to determine the location of a target 101b' on the lower control arm 102. An ET/EM device may be configured to determine the location of a target 101b on the frame/subframe 307. In some embodiments, a single ET/EM device may be configured to determine the location of both a target 101a on the tie rod 100 and a target 101b' on the lower control arm 102. In some embodiments, a single ET/EM device may be configured to determine the location of both a target 101a on the tie rod 100 and a target 101b on the frame/subframe 307. The ET/EM device 302 may be a stationary or a scanning laser. The ET/EM devices may be placed at or near floor level and the vehicle may be positioned above them on blocks, or on a rack, assembly line, or other such system.

The ET/EM devices may have or be in communication with a calculating device, such as a computer, calculator, phone, etc. The calculation of the camber angle 305 of the wheel 106 may be based at least on the measured height of the lower control arm 102, trigonometry, and known geometric relationships between the lower control arm 102 and the wheel 106. The known geometric relationships may depend on the design of the vehicle being aligned.

Although the target described in the above exemplary embodiments is a reflective pyramid, a target may be any device that supports a survey sighting of a position marked with a target. For example, the target could be a marker of any sort that supports a survey sighting, such as a colored mark, a high contrast grid or scale, or other marking that would support a survey sighting with an ET/EDM device or other survey instrument.

For example, in other embodiments, the targets may include one or more transmitters, transceivers or reflectors that emit, repeat, or reflect an electromagnetic signal, thereby allowing a precise location of a target to be determined using a plurality of receivers at known locations. For example, each of a plurality of receivers at known locations may be configured to receive an electromagnetic signal that is emitted, repeated, or reflected from a target. Each receiver may process the received signal to determine a precise distance from the target to each respective receiver. Once a precise distance from a target to each receiver is determined, a precise location of the target may be determined by using trigonometric calculations, known positions of the respective receivers, and determined distance between each of the receivers and the target. For example, using such techniques, the precise location of the target may be determined in three-dimensional space using as few as four receivers. Additional receivers may further increase the accuracy and precision of the determined target location, and/or may allow for the minimum of four receivers to receive a signal emitted, repeated, or reflected from a target when one or more of the receivers is in a location that is blocked from receiving the emitted, repeated, or reflected signal from a specific target.

Although the ET/EM devices and non-contact measuring devices in the above exemplary embodiments are generally fixed, or non-portable devices, ET/EM devices used in performing the above-described processes may also include portable devices.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A method of aligning a vehicle, the vehicle having a steering knuckle that is coupled to at least one control arm and at least one tie rod, the method comprising:
    projecting a laser on a target positioned on a movable portion of the tie rod, the target comprising a three dimensional protrusion extending from surrounding surfaces of the tie rod;
    detecting at least a portion of the laser reflected from the target;
    determining a position of the target at least based in part on the detected laser; and
    adjusting the position of the target until the target is in a position indicative of a desired alignment,
    wherein the three dimensional protrusion is a unitary piece of the tie rod.

2. The method of claim 1, wherein the target is configured to reflect the laser to a greater extent than the tie rod.

3. The method of claim 1, wherein the three dimensional protrusion is pyramidal in shape.

4. The method of claim 1, wherein adjusting the position of the target includes adjusting a length of the tie rod.

5. The method of claim 1, wherein adjusting the position of the target includes adjusting a ride height of the vehicle.

6. The method of claim 1, wherein the movable portion of the tie rod is movable with respect to the steering knuckle.

7. The method of claim 1, wherein the laser is projected up from beneath the vehicle.

8. A method verifying that a wheel of a vehicle is in a desired toe and camber position, the wheel coupled to a steering knuckle that is coupled to at least one control arm and at least one tie rod, the method comprising:
    measuring a ride height of the vehicle;
    retrieving a desired three dimensional position of a target disposed on a movable portion of the tie rod that is based at least in part on the measured ride height;
    determining a position of the target disposed on the movable portion of the tie rod with a non-contact measuring system; and
    comparing the determined position with the retrieved position to determine if the knuckle is in the desired toe and camber positions.

9. The method of claim 8, wherein measuring the ride height of the vehicle includes projecting a laser on to a target positioned on an underside of the vehicle.

10. The method of claim 8, wherein the retrieving a desired three dimensional position includes retrieving information from a memory circuitry.

11. The method of claim 9, wherein determining the position of the target disposed on the movable portion of the tie rod with a non-contact measuring system includes projecting a laser towards the target and detecting at least of portion of the laser reflected by the target.

12. The method of claim 11, wherein the target is a three dimensional protrusion extending from the underside of the tie rod, the three dimensional protrusion have a pyramidal shape.

13. The method of claim 11, wherein the target is a three dimensional indentation extending into the underside of the tie rod, the three dimensional indentation having a pyramidal shape.

14. An independent suspension and steering system having a built-in target for a wheel alignment system, the suspension and steering system comprising:
- a knuckle couplable to a wheel;
- a control arm coupled to the knuckle and to a portion of a vehicle frame; the control arm movable about its connection to the frame;
- a tie rod coupled to the knuckle and to a portion of the steering system, the tie rod configured to have an adjustable length;
- a target disposed on the tie rod; the target configured to reflect electromagnetic waves to a greater extent than the tie rod, the target capable of use with a system for determining the position of the target in three dimensional space during a wheel alignment; and
- a second target disposed on an underside of the control arm, the second target configured to reflect electromagnetic waves to a greater extent than the control arm.

15. The system of claim 14, wherein the target includes a three dimensional protrusion extending from surrounding surfaces of the tie rod.

16. The system of claim 15, wherein the three dimensional protrusion is a unitary piece of the tie rod.

17. The system of claim 16, wherein the three dimensional protrusion is pyramidal in shape.

* * * * *